United States Patent
Svensson et al.

(10) Patent No.: US 8,130,719 B2
(45) Date of Patent: Mar. 6, 2012

(54) PDSN-BASED SESSION RECOVERY FROM RBS/AN FAILURE IN A DISTRIBUTED ARCHITECTURE NETWORK

(75) Inventors: Sven Anders Borje Svensson, San Diego, CA (US); Vincent Baglin, San Diego, CA (US); Hai Le, Plano, TX (US); Prashanth Sharma, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1478 days.

(21) Appl. No.: 11/323,461

(22) Filed: Dec. 30, 2005

(65) Prior Publication Data
US 2007/0153751 A1 Jul. 5, 2007

(51) Int. Cl.
*H04W 4/00* (2009.01)

(52) U.S. Cl. ........ 370/331; 370/400; 370/441; 370/442; 370/447; 370/461; 370/462; 370/254; 370/244; 455/436; 455/437; 455/438; 455/453; 455/452.1; 455/452.2; 709/238; 709/245

(58) Field of Classification Search ............... 370/400, 370/441, 442, 447, 461, 462, 254, 331, 244; 455/436, 437, 438, 453, 452.1, 452.2; 709/238, 709/245
See application file for complete search history.

(56) References Cited

U.S. PATENT DOCUMENTS

| | | | |
|---|---|---|---|
| 6,438,374 B1 * | 8/2002 | Bhat | 455/423 |
| 2003/0026240 A1 * | 2/2003 | Eyuboglu et al. | 370/349 |
| 2003/0235168 A1 * | 12/2003 | Sharma et al. | 370/338 |
| 2004/0071090 A1 * | 4/2004 | Corson et al. | 370/244 |
| 2004/0109423 A1 * | 6/2004 | Sayeedi et al. | 370/328 |
| 2004/0120277 A1 * | 6/2004 | Holur et al. | 370/328 |
| 2005/0088997 A1 * | 4/2005 | Melpignano | 370/338 |
| 2005/0249131 A1 * | 11/2005 | Takahashi et al. | 370/254 |
| 2006/0198346 A1 * | 9/2006 | Liu et al. | 370/338 |

* cited by examiner

Primary Examiner — Nimesh Patel
(74) Attorney, Agent, or Firm — Coats & Bennett, P.L.L.C.

(57) ABSTRACT

An access node anchoring a connection to, e.g., a PDSN in a core network establishes a session with a mobile station and assigns the mobile station an identifier such as a UATI. The anchor node sends the UATI to the PDSN, such as in a GRE key where the data link is a GRE tunnel. If the anchor node fails and data addressed to the mobile station comes to the PDSN, it may initiate a page for the mobile using the UATI. The anchor node may additionally send the PDSN the session seed and optionally the mobile station's network location. A registration zone may be defined to include access nodes within a predetermined distance of the anchor node, and the mobile station forced to re-register when moving outside of the registration zone. In this case, the PDSN may initiate a page for the mobile station only within the registration zone.

11 Claims, 9 Drawing Sheets

PDSN-BASED SESSION RECOVERY FROM RBS/AN FAILURE IN A DISTRIBUTED ARCHITECTURE NETWORK

BACKGROUND

The present invention relates generally to mobile communication networks having a distributed architecture, and more particularly to a PDSN-based system and method of reestablishing a network connection to a mobile station following failure of a RBS.

Most radio access networks (RANs) employed today use a hierarchical network architecture in which each higher level entity supports multiple lower level entities. High rate packet data (HRPD) networks according to the Third Generation Partnership Project 2 (3GPP2) standard exemplify this type of hierarchical network. In HRPD networks, a packet control function performing session control and mobility management functions connects multiple base station controllers (also known as access node controllers) to the core network. Each base station controller, in turn, connects to multiple radio base stations and performs radio resource control functions. The radio base stations communicate over the air interface with the mobile stations. This conventional hierarchical architecture has worked well for voice services and most packet data services.

HRPD networks are now evolving toward a distributed architecture in which the radio base station, base station controller, and packet control function are integrated into a single node referred to herein as an access node (AN). The ANs help reduce the amount of hardware in the network by taking advantage of spare processing capacity in the radio base station. In the new distributed architecture, functions traditionally performed by centralized nodes, such as session management and mobility management, are distributed among a plurality of network nodes. This architecture enhances robustness by eliminating critical central network nodes, the failure of which could cripple entire segments of the network.

In the distributed architecture, critical information such as session management information is duplicated among two or more ANs. If the AN providing a data link to a mobile station fails, another AN maintains the information necessary to reestablish the HRPD communication sessions with the mobile station, and to reroute packet data through the network to reach the mobile station. By encoding the identification of this AN into a session identification tag assigned to the mobile station, when the mobile station requests access to the system, any AN receiving the access request can locate the AN storing the HRPD session information, by inspection of the mobile station's identifier. However, if the AN anchoring the network connection fails and the mobile station is dormant, it may become unreachable from the network perspective, as the core network is unable to page the mobile station to force it to access the network. The core network does not know the identification assigned to the mobile station, or to which time slot the mobile station has been assigned.

SUMMARY

In a distributed architecture an access node anchoring a packet data communication link to a core network establishes a session with a mobile station and assigns the mobile station an identifier. The anchor node sends the mobile station identifier to the core network upon establishing the packet data communication link. A node such as the PDSN in the core network stores the mobile station identifier. Where the anchor node packet data communication link to the PDSN is a Generic Routing Encapsulation (GRE) tunnel, the anchor node may send the mobile station identifier as a GRE key. The anchor node also sends the PDSN the session seed, identifying which time slot to which the mobile station is assigned. If the anchor node fails or becomes unavailable, the mobile station is dormant, and data packets addressed to the mobile station arrive at the PDSN, the PDSN may initiate a page for the mobile station using the network identifier.

Under a distance-based registration protocol, a dormant mobile station may move within a registration zone without re-registering each time it enters a cell served by a different access node. When the dormant mobile station moves outside the registration zone, it must re-register, such as by sending a Route Update signal. The network may then establish a new packet data communication link to the access node (i.e., making it the anchor node), and inform the mobile station of its new registration zone. If the anchor node fails, the PDSN may initiate a page for the mobile station only to access nodes within the registration zone.

In one embodiment, the present invention relates to a method implemented by an access node in a mobile communication network comprising a plurality of access nodes and connected to a core network. A communication session is established with a mobile station. An identifier for the mobile station is obtained. A packet data communication link is established with the core network to become an anchor node for the session. The mobile station identifier is sent to the core network to enable the core network to page the mobile station if the anchor access node becomes unavailable.

In another embodiment, the present invention relates to a method implemented by a node in a core network connected to a mobile communication network comprising a plurality of access nodes. A packet data communication link is established with an access node. An identifier for a mobile station is received from the access node and stored. In response to the unavailability of the access node anchoring the data link, a page for the mobile station is initiated.

In yet another embodiment, the present invention relates to an access node in a mobile communication network comprising a plurality of access nodes. The access node includes a transceiver system for communicating with a mobile station. The access node additionally includes a control circuit comprising a session controller and packet control function configured to establish a packet data communication link with a core network to become an anchor node for a communication session with a mobile station; obtain a mobile station identifier; and send to the core network the mobile station identifier to enable the core network to initiate a page for the mobile station upon the unavailability of the primary node.

In still another embodiment, the present invention relates to a Packet Data Services Node (PDSN) in a core network connected between a mobile communication network and a packet data network. The PDSN includes at least one data communication interface. The PDSN also includes a control circuit configured to establish a packet data communication link with an anchor node in the mobile communication network, the anchor node operative to transfer data packets to and from a mobile station; receive from the anchor node a mobile station identifier; store the mobile station identifier; and if the anchor node becomes unavailable, initiate a page for the mobile station using the mobile station identifier.

In still another embodiment, the present invention relates to a method of establishing a Generic Routing Encapsulation (GRE) protocol connection between an access node in a mobile communication network comprising a plurality of access nodes, and a PDSN in a core network. At the access node, a communication session is established with a mobile station. The mobile station is assigned a mobile station identifier. A GRE connection to the PDSN is established using a GRE key having the value of the mobile station identifier.

DETAILED DESCRIPTION

Figure 1:
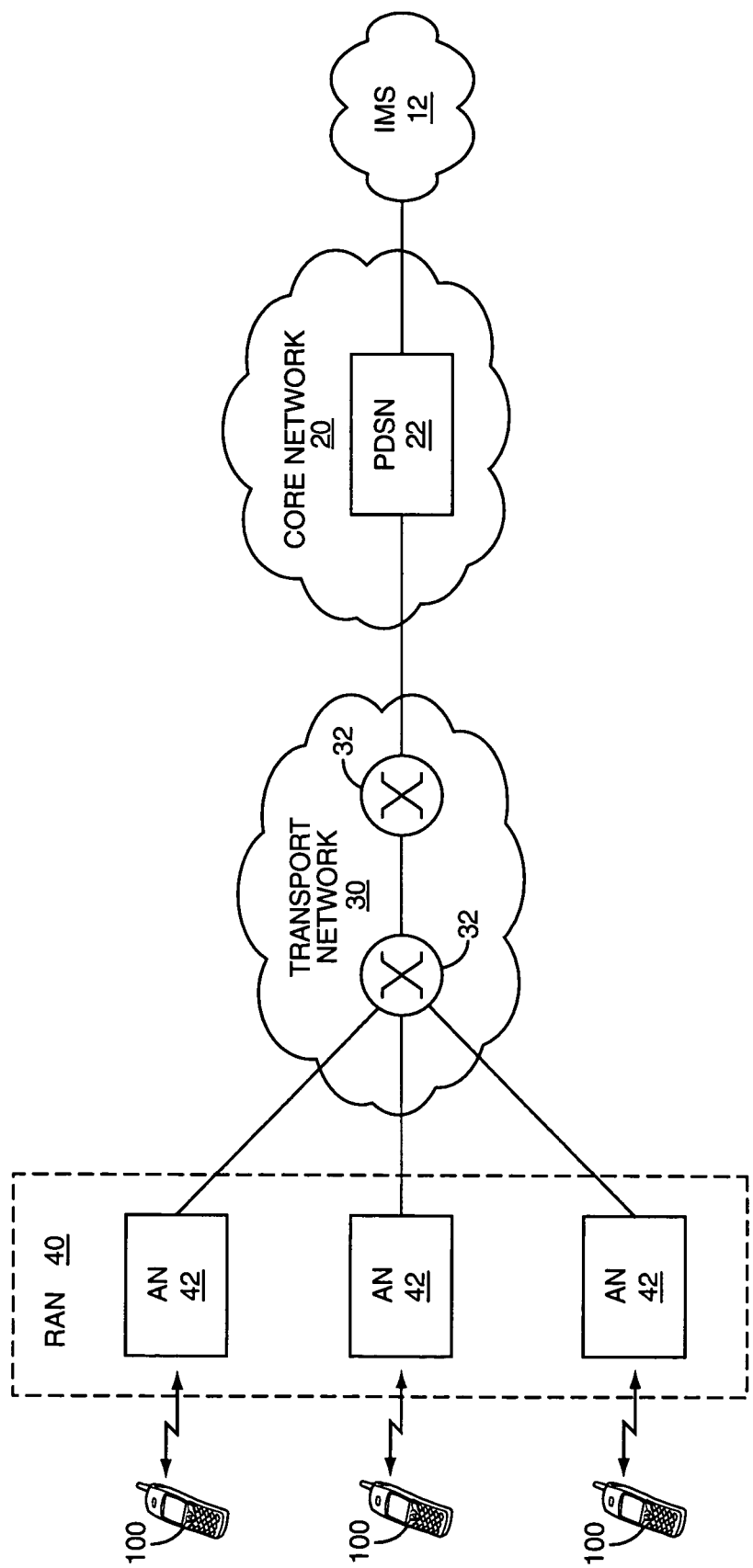
FIG. 1 is a functional block diagram of a distributed architecture mobile communication system.

FIG. 1 illustrates a mobile communication network 10 according to one embodiment of the invention providing wireless packet data services to a plurality of mobile stations 100. Mobile communication network 10 has a distributed rather than hierarchical architecture. Mobile communication network 10 comprises a packet-switched core network 20 including a Packet Data Serving Node (PDSN) 22, an IP-based transport network 30, and a radio access network 40 comprising one or more access nodes (ANs) 42.

The PDSN 22 connects to an external packet data network (PDN) 12, such as the Internet, and supports PPP connections to and from the mobile stations 100. IP streams are added and removed between the ANs 42 and the PDSN 22. The PDSN 22 routes packets between the external packet data network 12 and the ANs 42. The transport network 30 comprises one or more routers 32 and connects the ANs 42 with the core network 20.

The ANs 42 comprise base stations that provide the radio connection with the mobile stations 100. The ANs 42 may operate, for example, according to the Telecommunications Industry Association (TIA) standard TIA-856-A (3GPP2 C.S0024-A), which defines an air interface between the AN 42 and mobile stations 100. Those skilled in the art will appreciate that the present invention may also use other air interface standards, such as TIA-2000 or the emerging Wideband CDMA standard.

Figure 2:
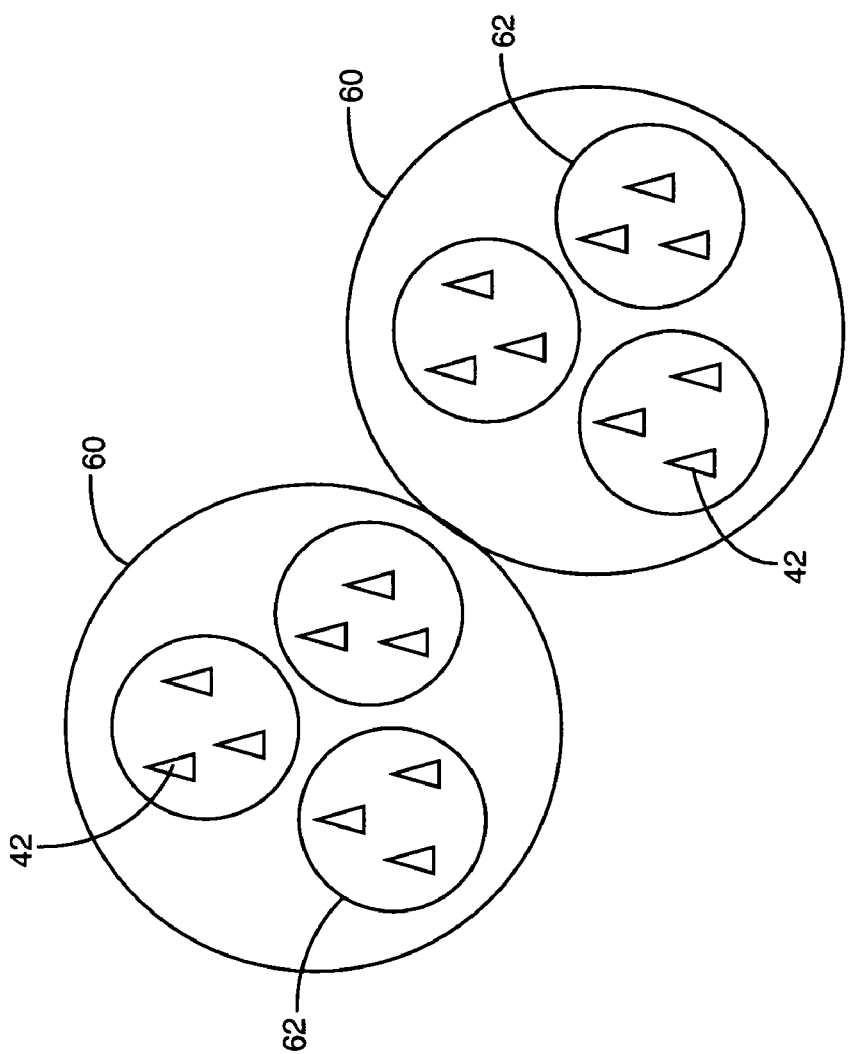
FIG. 2 is a diagram of subnets and color code areas of the mobile communication system.

The ANs 42 are grouped to form subnets 60 as shown in FIG. 2. Each subnet 60 preferably covers a large area. Each subnet 60 is further divided into smaller areas referred to herein as color code areas 62, which may encompass one or more ANs 42.

Figure 3:
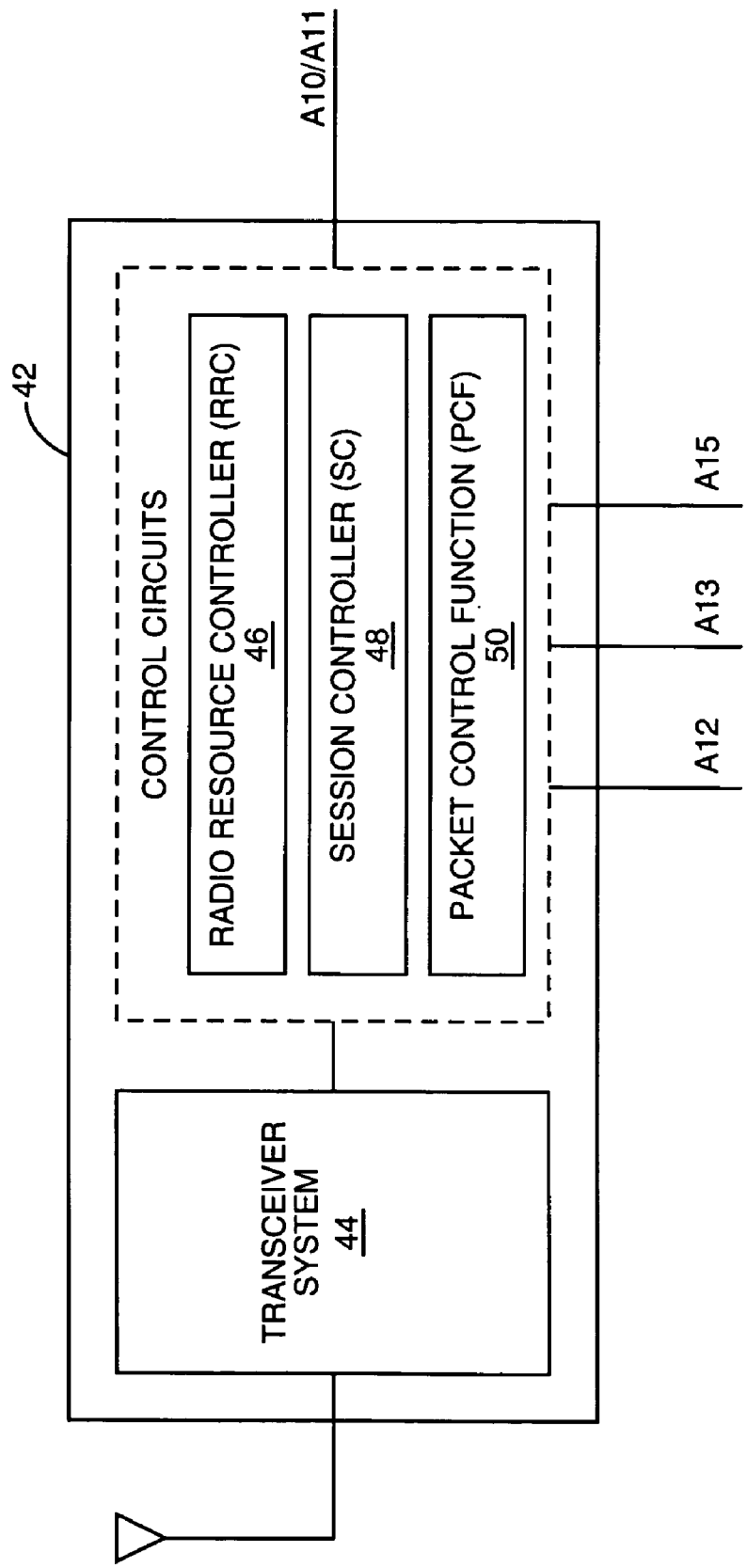
FIG. 3 is a functional block diagram of an access node in the mobile communication system.

FIG. 3 illustrates the logical elements of an AN 42 in one exemplary embodiment. The exemplary AN 42 comprises a transceiver system 44 and associated control circuits, including a radio resource controller (RRC) 46, a session controller (SC) 48, and a Packet Control Function (PCF) 48 as defined in TIA-1878. The transceiver system 44 includes the radio equipment for communicating over the air interface with the mobile stations 100. The radio resource controller 46 manages radio and communication resources for the AN 42. The session controller 48 performs session control and mobility management (SC/MM) functions. The PCF 50 establishes, maintains, and terminates connections from the AN 42 to the PDSN 22.

Between the AN 42 and the PDSN 22, the user data travels over the A10 communication link. Signaling data travels between the AN 42 and PDSN 22 over the A11 link. Signaling between the ANs 42 travels over the A13 and A15 communication links. The A13 communication link is used to transfer session information between ANs 42. The A15 communication link is used for inter-AN paging. The AN 42 communicates with an AAA over the A12 communication link to authenticate mobile stations 100 attempting to access the network. The A10, A11, A12, A13 and A15 interfaces are defined in TIA-1878 (3GPP2 A.S0007-A).

Generic Routing Encapsulation (GRE) is used to transport data over the A10 communication link. GRE is a well-known protocol for encapsulation of an arbitrary network layer protocol over another arbitrary network layer protocol; a GRE connection is commonly referred to as a "tunnel" between its endpoint network nodes. The GRE protocol is described in the Internet Engineering Task Force (IETF) standard identified as RFC 2784.

To transmit or receive packet data, the mobile station 100 establishes a high rate packet data (HRPD) session with an AN 42. For each HRPD session, the AN 42 opens one or more radio packet (R-P) connections (also called an A10 connection) with the PDSN 22 to establish a transmission path for packet data between the PDSN 22 and the AN 42. The PDSN 22 assigns the mobile station 100 an Internet Protocol (IP) address, and establishes a PPP session between the mobile station 100 and the PDSN 22.

The packet data network 12 connected to the PDSN 22 may comprise an IP Multimedia Subsystem (IMS) network. The IMS is a general-purpose, open industry standard for voice and multimedia communications over packet-based IP networks. The IMS network 12 includes Application Servers (not shown) providing various services such as audio and video broadcast or streaming, Voice over IP (VoIP), video-conferencing, games, file-sharing, e-mail, and the like. Communications with and within the IMS network 12 utilize the Session Initiation Protocol (SIP). SIP is a signaling protocol for Internet conferencing, telephony, presence, events notification, instant messaging, and the like. Upon establishment of the PPP connection to the PDSN 22, the mobile station 100 performs a SIP registration of its IP address with the IMS 12.

The AN 42 negotiates HRPD session parameters with the mobile station 100 and establishes traffic channels for forward and reverse link traffic. The HRPD session parameters include the protocols used for communication between the AN 42 and mobile station 100, and the protocol settings. One such session parameter, called the session seed, identifies the time-division multiplexed time slot to which the mobile station 100 has been assigned. The HRPD session parameters are stored by the session controller 48 at the AN 42.

Figure 4:
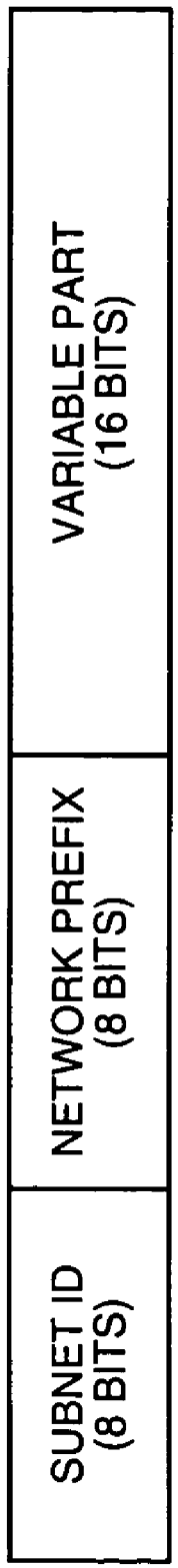
FIG. 4 is a diagram of a Unicast Access Terminal Identification.

When the HRPD session is established, the mobile station 100 is assigned a Unicast Access Terminal Identifier (UATI) to use for the duration of the session. The UATI uniquely identifies the mobile station 100 to the ANs 42 within a subnet 60. In one exemplary embodiment, the UATIs are divided among the ANs 42 in the subnet 60 and have the structure shown in FIG. 4. Each AN 42 has its own pool of UATIs to allocate to mobile stations 100. In the embodiment shown in FIG. 4, the UATI comprises 32 bits. The 16 least significant bits of the UATI are variable and are selected by the AN 42 when an HRPD session is set up. These 16 bits uniquely identify the mobile station 100 to the AN 42. The 8 middle bits are fixed for a given AN 42 and uniquely identify an AN 42 within a given color code area 62. These 8 bits indicate which AN 42 in a color code area is storing the HRPD session information. The 8 most significant bits are fixed and uniquely identify a color code area 62 in a subnet 60. In this arrangement, a subnet 60 may include up to 256 color code areas 62, each of which may include up to 256 ANs 42. Thus, a subnet may include over 65,000 ANs 42, each of which has over 65,000 UATIs to allocate to mobile stations 100.

During the HRPD session, the mobile station 100 receives data from only one AN 42 at a time, which is referred to herein as the serving AN. When an active mobile station 100 moves between cells, a handover is performed. A handover is a procedure for transferring a session or call from one serving AN 42 to another. The AN 42 releasing the mobile station during a handover is called the source AN 42 and the AN 42 acquiring the mobile station 100 during the handover is called the target AN 42. When the handover is complete, the target AN 42 becomes the new serving AN 42.

The target AN 42 may then exchange packet data with the PDSN 22 through the AN 42 anchoring an A10 connection to the PDSN 22 (referred to as the anchor AN 42). The data packets are exchanged along sidehaul links between the target AN 42 and the anchor AN 42. Alternatively, the target AN 42 may establish a new A10 connection to the PDSN 22, becoming the anchor AN 42 for the mobile station. When a mobile station 100 is dormant and moves between cells served by different ANs, in general the network does not track the position of the mobile station 100.

In an exemplary embodiment, a distance-based registration protocol is used to restrict uncertainty as to the location of a dormant mobile station 100. The protocol defines a registration zone that may span a plurality of ANs 42. A dormant mobile station 100 may move between cells served by ANs 42 within the registration zone without registering its location with the mobile communication network 10. If the dormant mobile station 100 moves outside of the registration zone—that is, if it moves into a cell served by an "outside" AN 42—it must update the network 10, such as by sending a Route Update message to the outside AN 42. The network 10 may then establish an A10 connection to the outside AN 42. If the AN 42 anchoring the A10 connection fails, the network 10 may assume that the dormant mobile station 100 is within the registration zone (since it is required to re-register upon moving outside of that zone), and may limit pages for the mobile station 100 to the ANs 42 within the registration zone.

In the exemplary embodiments described herein, an AN 42 can serve at least four different roles in support of a HRPD session. For convenience, the ANs 42 are denominated herein as a connecting AN, serving AN, primary AN, or anchor AN, depending on the role that the AN 42 serves for a given mobile station 100. In some instances, an AN 42 can simultaneously serve multiple roles.

The connecting AN is the AN 42 to which the mobile station 100 sends access requests on the reverse link to establish a connection for transmitting or receiving data. The serving AN is the AN 42 that transmits data to the mobile station 100 over the forward Traffic Channel (FTC). The primary AN for a given mobile station 100 is the AN 42 that stores the location and HRPD session information for the mobile station 100. The primary AN, according to one exemplary embodiment, allocates a UATI to the mobile station and performs HRPD session control functions as defined in TIA-1878 for the communication session. The anchor AN for a given mobile station 100 is the AN 42 where the R-P connection for the mobile station 100 terminates (that is, the AN 42 maintaining an A10 connection to the PDSN 22). As explained herein, different ANs 42 typically serve as the anchor AN 42 and the primary AN 42 for a particular mobile station 100.

Each AN 42 in a subnet is capable of determining the address of and accessing the primary AN 42 for a given mobile station 100. In the exemplary embodiment, the identity of the primary AN 42 is determined based on the AN field of the UATI. The UATI is typically included in access channel messages sent by the mobile station 100 over the reverse access channel. Based on the UATI obtained from the mobile station 100, any connecting AN 42 can determine the identity of the primary AN for that mobile station 100. Once a mobile station 100 has been assigned a UATI, the mobile station 100 keeps the same UATI for the lifetime of an HRPD session, unless it moves into a different subnet 60. Methods of allocating UATIs to mobile stations 100 are described in a related application entitled "METHOD OF ALLOCATING MOBILE STATION IDENTIFIERS AND USING MOBILE STATION IDENTIFIERS TO LOCATE SESSION INFORMATION," filed simultaneously herewith and identified by Ser. No. 11/324,186. This application is incorporated herein by reference.

The primary AN 42 serves as the principal location for storing HRPD session information for a communication session with a mobile station 100 and performs the HRPD session control function. The primary AN 42 is capable of determining the address of and accessing the anchor AN 42. Both the primary AN 42 and anchor AN 42 store the current location of the mobile station 100 (i.e., the address of the AN 42 that last received an access message from or last served the mobile station 100). Also, both the anchor AN 42 and primary AN 42 store the HRPD session state information records (SSIRs) for the mobile station 100. The HRPD session information stored in the primary AN 42 is the same as the session information stored in the anchor AN 42, except during transient periods when the session is being updated or modified. As will be described in more detail below, it is possible to deliver data to the mobile station 100 as long as either the primary AN 42 or anchor AN 42 is available.

Note that it is possible to design and operate the wireless communication system 10 such that each AN 42 assumes all four functional roles. For example, a particular AN 42 may serve as a connecting AN 42 when a mobile station 100 requests access. The connecting AN 42 may assign the mobile station 100 a UATI, negotiate HRPD session and PPP session parameters, and authenticate the mobile terminal 100, becoming the primary AN 42 for the mobile station 100 (that is, it performs session management and stores the session information). Additionally, the AN 42 may establish an R-P, or A10, connection to the PDSN 22 (extending the PPP connection from the mobile terminal 100 to the PDSN 22), becoming the anchor AN 42. The anchor AN 42 may receive data packets from the PDSN 22 and transmit them to the mobile station 100 on the forward link, becoming the serving AN 42 as well. In this case, a single AN 42 would be the connecting, primary, anchor, and serving AN 42 for the mobile station 100.

For several reasons, it is preferred to distribute the four functional roles among two or more ANs 42. One reason is UATI load-balancing. With the UATI structure depicted in FIG. 4, each AN 42 has over 65,000 UATIs to assign to mobile stations 100 requesting service. Simulations have shown that an AN 42 at some locations, such as at a major airport, may assign 65,000 UATIs in five hours. Once established, a HRPD session does not time-out for 54 hours. Thus, ANs 42 in busy locations may deplete their store of UATIs, and would subsequently not be able to provide service to requesting mobile station 100.

To load-balance UATI utilization across a color code area 62 or subnet 60, a connecting AN 42 may select another AN 42 within the color code area 62 or subnet 60 to serve as the primary AN 42. The primary AN 42 assigns the mobile station 100 a UATI from its own supply of over 65,000, and subsequently performs HRPD session and mobility management for the mobile station 100. The connecting AN 42 may then establish an R-P connection to the PDSN 22, becoming the anchor AN 42 (and the serving AN 42 when transmitting packet data to the mobile station 100). The side haul traffic required between the anchor AN 42 and the primary AN 42 to enable the primary AN 42 to perform session and mobility management is negligible. The connecting AN 42 may select the primary AN 42 according to a predetermined algorithm, or the selection may be random.

Another reason to assign the primary and anchor functions to different ANs 42 is redundancy. As discussed above, both the primary AN 42 and the anchor AN 42 (which is typically also the serving AN 42) maintain a copy of the session information and the location of the mobile station 100. If the primary AN 42 experiences a failure, the anchor AN 42 may select another AN 42, provide it with the session parameters, and request a UATI. The new AN 42 may assign a new UATI to the mobile station 100 and manage the HRPD session information, becoming the new primary AN 42 for the mobile station 100. Similarly, if the anchor AN 42 fails, and the (dormant) mobile station 100 requests service from any connecting AN 42 in the subnet 60, the connecting AN 42 can identify the primary AN 42 from the UATI, obtain HRPD session information from the primary AN 42, and establish a R-P (A10) connection to the PDSN 22, becoming the new anchor (and serving) AN 42 for the mobile terminal 100.

However, if an anchor AN 42 fails and a mobile terminal 100 served by the AN 42 is dormant, data for the mobile station 100 that arrives at the PDSN 22 from an external network 12 cannot be routed to the mobile station 100. The A10 connection between the PDSN 22 and the anchor AN 42 is lost, and the PDSN 22 does not know which other AN 42 in the system 10 is serving as the primary AN 42. As described above, if the mobile station 100 requests service from any AN 42 in the subnet, the connecting AN 42 can locate the primary AN 42 from the UATI, and obtain the HRPD session information; hence, the PDSN need only cause the mobile station 100 to access the system. However, the PDSN 22 cannot initiate a page for the mobile station 100 because it does not know the UATI assigned to the mobile station 100, its location within the subnet 60, or any of the HRPD session information, such as the session seed.

According to one or more embodiments of the present invention, upon setting up a new HRPD session with a mobile station 100 and establishing an R-P connection to the PDSN 22, the anchor AN 42 provides the PDSN 22 with the mobile station identifier (e.g., the UATI) and the session seed. Furthermore—particularly in embodiments where the distance-based registration protocol is not employed—each serving AN 42 may update the PDSN 22 with the location of the mobile station 100, such as following a handover from a source AN 42 to a target AN 42, or upon receipt of a Route Update message from the mobile terminal 100.

In an exemplary embodiment, the anchor AN 42 may send the UATI to the PDSN 22 as a GRE key. The GRE key is a defined, optional field in the GRE header that contains a four-octet value inserted by the encapsulator (in this case, the anchor AN 42). Whether the GRE header includes a GRE key is indicated by a K (key present) bit in the third bit position of the GRE header. The GRE key is used to identify an individual traffic flow within a GRE tunnel. That is, GRE packets for different traffic flows may be intermixed in a GRE tunnel. The decapsulator (in this case, the PDSN 22) will logically group those GRE packets having the same GRE key in the GRE header as belonging to the same traffic flow. Thus, the GRE key is necessarily stored at the decapsulator (PDSN 22), for comparison to subsequent received GRE packets. By using the UATI as the GRE key, the anchor AN 42 ensures that the PDSN 22 stores the UATI. The uniqueness of the GRE key is assured, since the primary AN 42 assigns a unique value of the UATI mobile station identifier field to each mobile station 100 for which it manages an HRPD session, and another bit field of the UATI identifies the primary AN 42.

In an exemplary embodiment, the anchor AN 42 additionally sends the session seed to the PDSN 22 as part of or following the establishment of an A10 connection. Once the PDSN 22 has the UATI and the session seed, if the anchor AN 42 fails and the PDSN 22 cannot reach the mobile station 100 through it, the PDSN 22 may initiate a page for the mobile station 100. Where the distance-based registration protocol is employed—forcing the A10 anchor to move when the mobile station 100 is handed over to a sufficiently distant target AN 42—the PDSN 22 may avoid initiating a flood page for the mobile station 100 throughout the subnet 60 by initiating a page only within the packet zone associated with the failed anchor AN 42. In other embodiments, the PDSN 22 may initiate a page for the mobile station 100 at or near its last network location update.

Figure 5A:
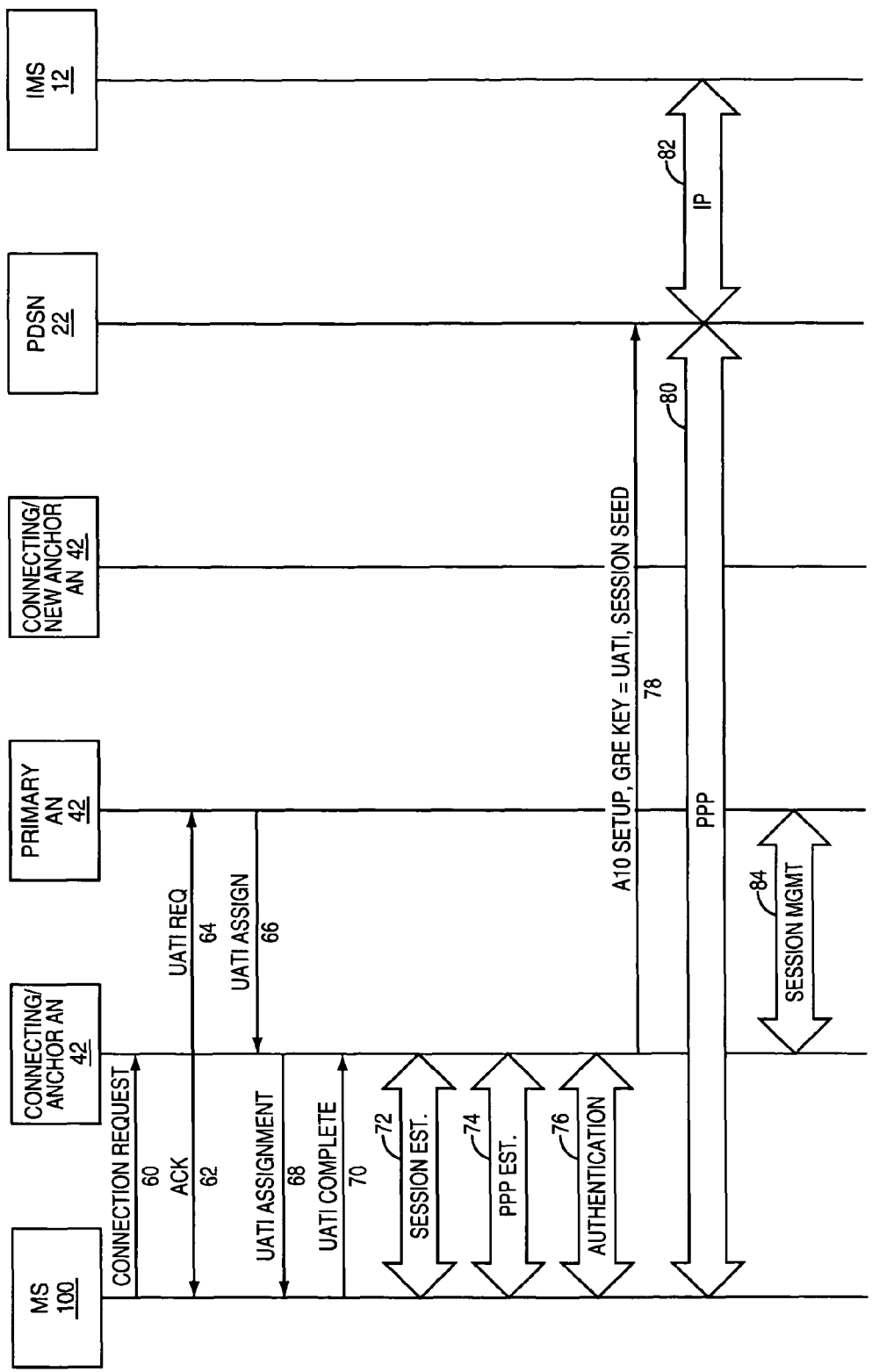
FIGS. 5A and 5B are a signal flow diagram for a method of network recovery.
Figure 5B:
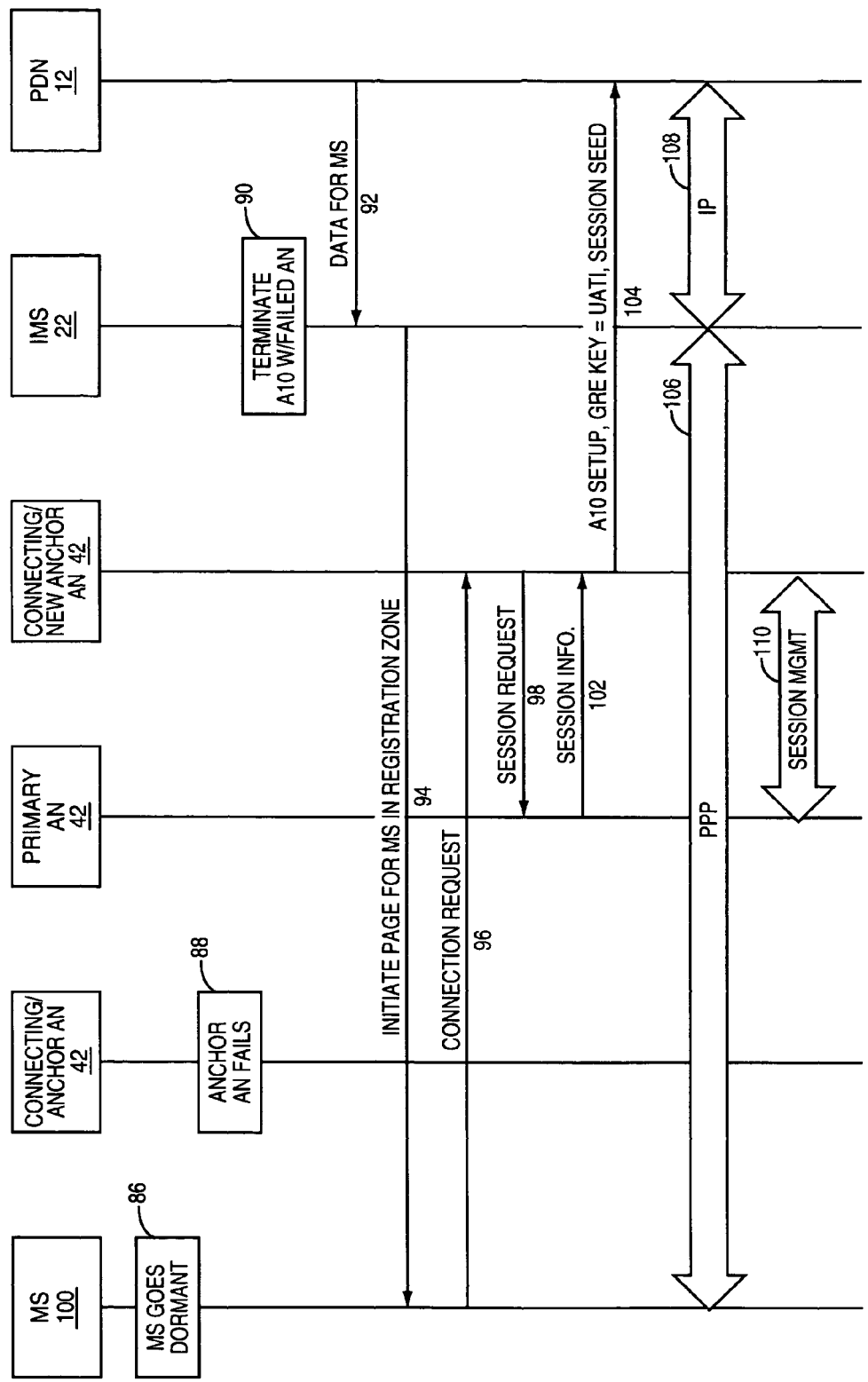
Figure 6A:
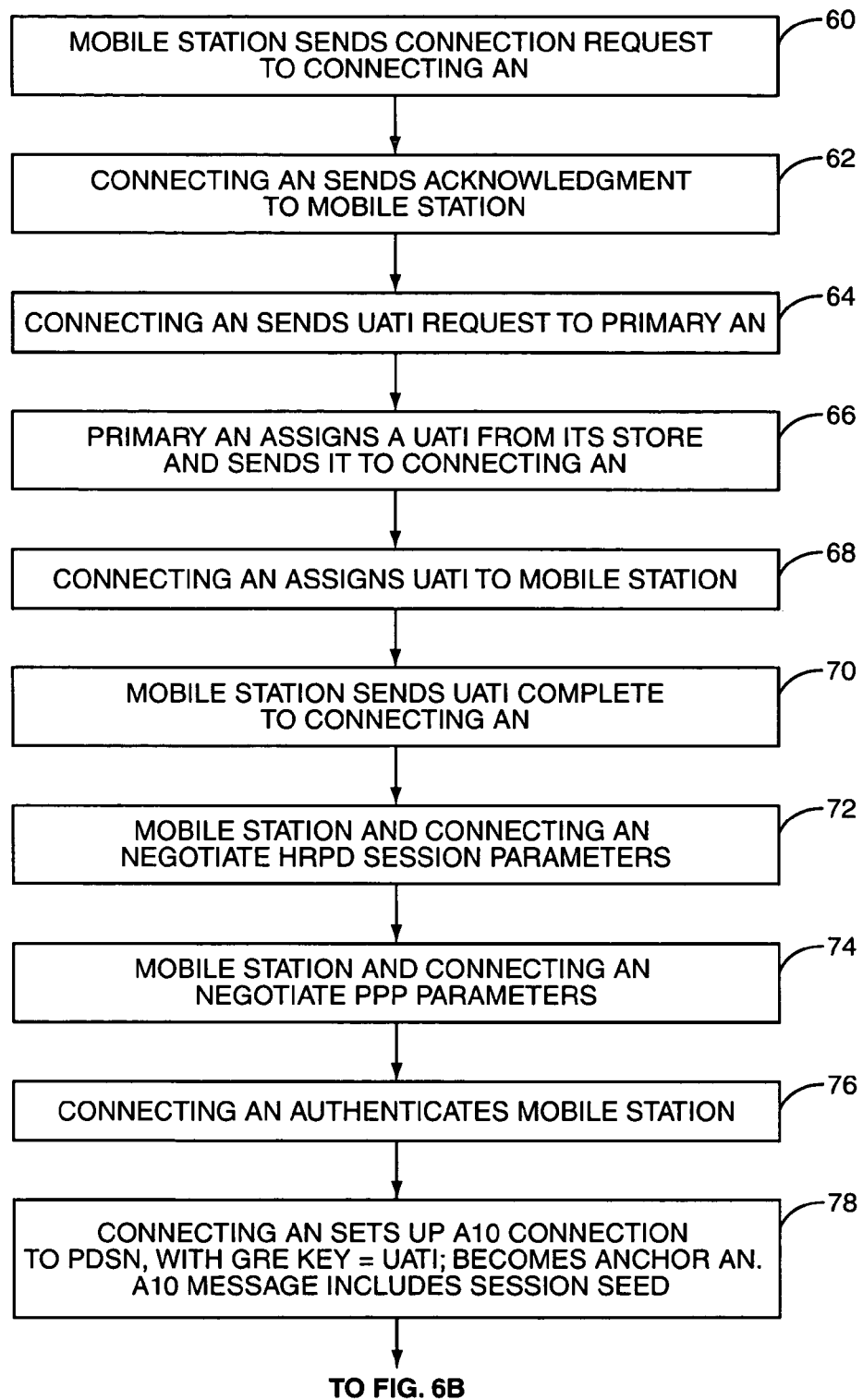
FIGS. 6A-6C are a flow diagram corresponding to FIGS. 5A-5B.
Figure 6B:
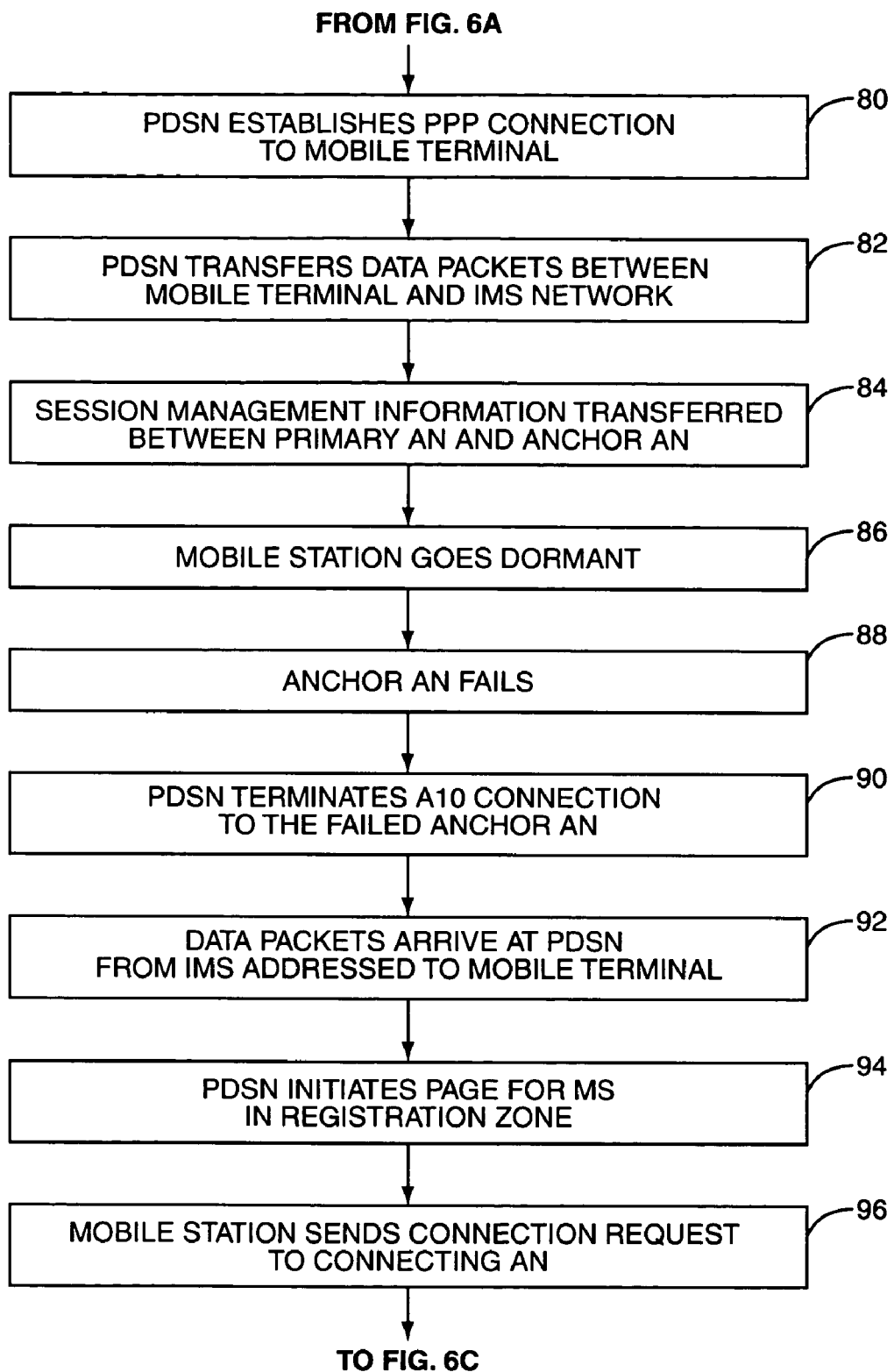
Figure 6C:
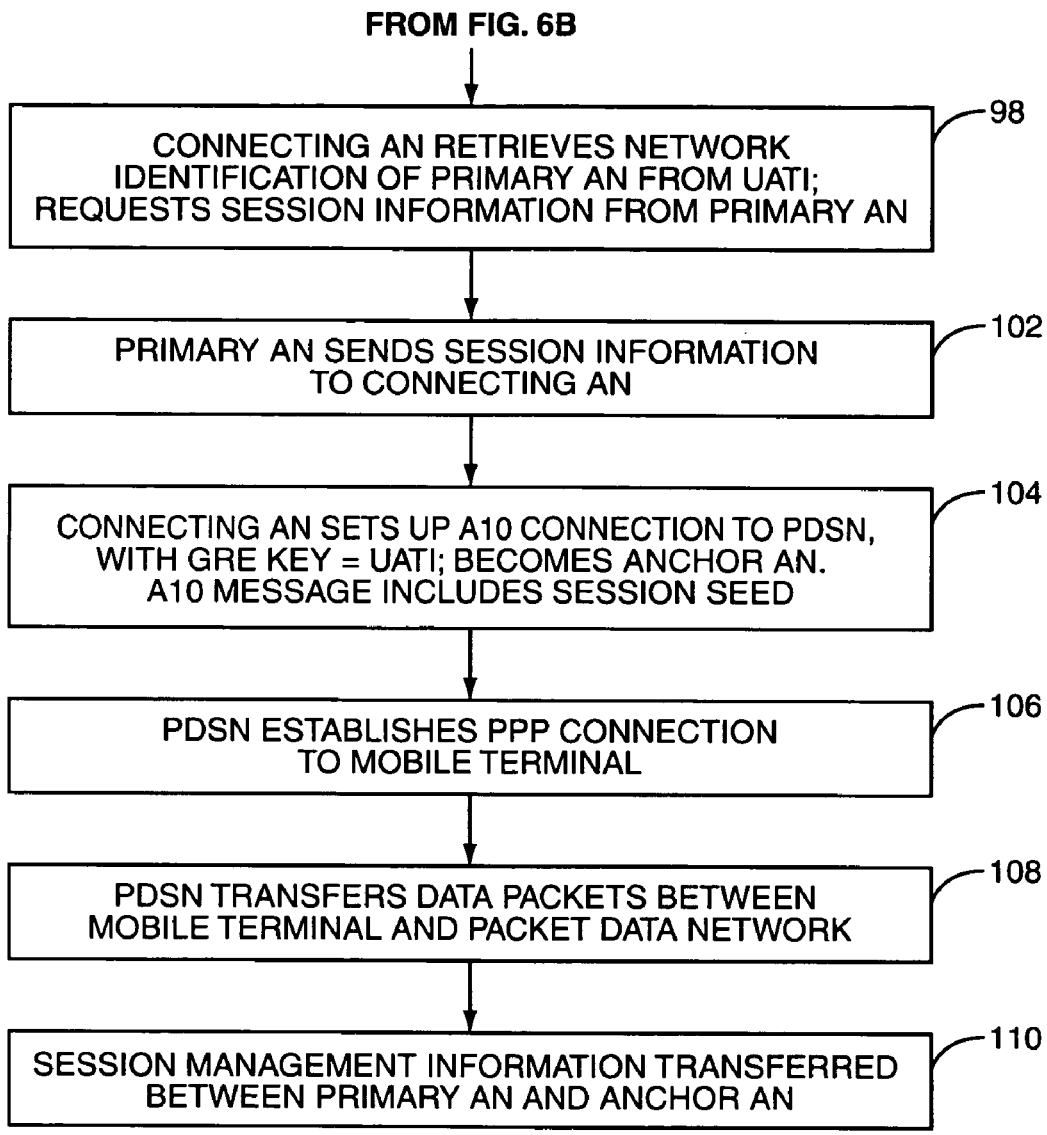

FIG. 5 depicts the call flow for a HRPD session with a mobile station 100, wherein the anchor AN 42 serving the mobile station 100 fails. FIG. 6 is a flow diagram depicting the corresponding method steps. A mobile station 100 begins the HRPD session by sending a Connection Request to a connecting AN 42 (block 60). The connecting AN 42 responds with an Acknowledgment (block 62), and sends a UATI Request message to a primary AN 42 (block 64). The primary AN 42 may be selected according to an algorithm, or may be randomly selected from ANs 42 in the subnet 60. The primary AN 42 selects a unique UATI from its store and forwards it to the connecting AN 42 (block 66). The connecting AN 42 assigns the UATI to the mobile station 100 (block 68). The mobile station 100 responds with a UATI Complete message (block 70). The mobile station 100 and the connecting AN 42 negotiate HRPD session parameters (block 72) and Point-to-Point Protocol (PPP) parameters (block 74). The connecting AN 42 authenticates the mobile station 100 (block 76). This may, for example, comprise issuing an authentication challenge to the mobile station 100, receiving a response, and authenticating the mobile station 100 by forwarding the challenge and response over an A12 link to an AAA network node (not shown).

Following authentication, the connecting AN 42 establishes an A10 connection to the PDSN 22, using the UATI assigned to the mobile station 100 as the GRE key and including the session seed (block 78). The PDSN 22 establishes a PPP connection with the mobile terminal 100 (block 80) and assigns it an IP address. The PDSN 22 stores the UATI value and session seed. At this point, the connecting AN 42 becomes the anchor AN 42. The mobile station 100 registers with the IMS network 12, and the PDSN 22 transfers data packets between the mobile terminal 100 the IMS network 12 over an IP connection (block 82). Upon the transfer of data packets from the PDSN 22 to the mobile station 100, the anchor AN 42 additionally becomes the serving AN 42.

Packet data communications continue between the mobile station 100 and the IMS network 12, with session management information being communicated between the primary AN 42 and the anchor AN 42 (block 84) as needed. The mobile station 100 may go dormant (block 86). After a predetermined time-out period, the serving AN 42 may reallocate radio resources away from the mobile terminal 100; however, the HRPD session, PPP session, and IMS registration remain intact. If the dormant mobile station travels outside of its registration zone, it must send a Route Update message to the first AN 42 serving the cell into which the mobile terminal 100 moves (not shown). The PDSN 22 may then establish a new R-P (A10) connection to the outside AN 42 (not shown).

At some point, the anchor AN 42 fails, such as due to a software crash, hardware malfunction, power failure, or the like (block 88). This will cause the PDSN 22 to terminate the A10 connection to the failed anchor AN 42 (block 90). When subsequent data packets arrive from the IMS network 12 for the mobile terminal 100 (block 92), the PDSN 22 must locate the mobile terminal 100. The PDSN 22 has the UATI of the mobile station 100 from the GRE key, and the session seed. The PDSN 22 initiates a page to the mobile station 100 by forwarding the UATI and the session seed to the ANs 42 in the registration zone of the failed anchor AN 42 (block 94). That is, the PDSN 22 initiates a page for the mobile station 100 to the ANs 42 that are within a predetermined distance of the failed anchor AN 42.

The mobile station 100 responds to the page by sending a Connection Request to a connecting AN 42 in the subnet 60 (block 96). The connecting AN 42 retrieves the network identification of the primary AN 42 from the UATI, and requests session information from the primary AN 42 (block 98). The primary AN 42 supplies the session information (block 102). Alternatively, the connecting AN 42 may select a different primary AN 42, and request a new UATI from the new primary AN 42, replicating the signaling of blocks 64-76, described above. The connecting AN 42 then sets up an A10 connection to the PDSN 22, again with a GRE key having the value of the UATI and the session seed (block 104), thus becoming the new anchor AN 42 for the mobile station 100.

The PDSN 22 establishes a PPP connection to the mobile station 100 (block 106), and resumes exchanging data packets between the mobile station 100 and the IMS network 12 (block 108). When the new anchor AN 42 delivers data packets to the mobile station 100, it additionally becomes the serving AN 42. Session management information is transmitted between the new anchor AN 42 and the primary AN 42 as necessary (block 110). In this manner, the packet data connection between the mobile station 100 and the IMS network 12 is reestablished following a failure of the anchor AN 42, when the mobile station 100 is dormant and the network 10 has data to deliver to the mobile station 100.

The system and method of network recovery of the present invention has been described herein with respect to a distributed architecture wireless communication network 10 comprising a HRPD wireless RAN 40 and a PDSN 22. However, the invention is not limited to such an implementation. For example, the present invention may be advantageously applied to the High Speed Downlink Packet Access (HSPDA) protocol of WCDMA in lieu of the HRPD protocol, and/or a GPRS Serving Node (GSN) instead of the PDSN 22.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method implemented by an access node in a mobile communication network comprising a plurality of access nodes and connected to a packet data serving node in a core network, comprising:

establishing a communication session with a mobile station over a radio interface;

obtaining an identifier for the mobile station;

establishing a packet data communication link with the packet data serving node in the core network to become an anchor node for a packet data session between the mobile station and the packet data serving node; and sending the mobile station identifier to the core network to enable the core network to initiate a page for the mobile station if the anchor node becomes unavailable.

2. The method of claim 1 wherein establishing a packet data communication link with the packet data serving node in the core network comprises establishing a Generic Routing Encapsulation (GRE) protocol packet data tunnel between the anchor node and a Packet Data Services Node (PDSN) in the core network.

3. The method of claim 2 wherein sending the mobile station identifier to the core network comprises sending a GRE key derived from the mobile station identifier.

4. The method of claim 1 further comprising sending session information to the core network.

5. The method of claim 4 wherein the session information comprises a session seed identifying a time slot to which the mobile station is assigned.

6. The method of claim 1 wherein obtaining an identifier for the mobile station comprises assigning the mobile station an identifier.

7. The method of claim 1 wherein obtaining an identifier for the mobile station comprises:

selecting a different access node in the mobile communication network to serve as a primary node performing session management for the mobile station;

requesting a mobile station identifier from the primary node; and receiving the mobile station identifier from the primary node.

8. The method of claim 1 wherein the identifier for the mobile station is a Unicast Access Terminal Identifier.

9. An access node in a mobile communication network comprising a plurality of access nodes connected to a packet data serving node in a core network, the access node comprising:

a transceiver system for communicating with a mobile station; and a control circuit comprising a session controller and packet control function configured to:

establish a packet data communication link with the packet data serving node in the core network to become an anchor node for a communication session with a mobile station;

obtain a mobile station identifier; and send to the packet data serving node in the core network the mobile station identifier to enable the packet data serving node in the core network to initiate a page for the mobile station upon the unavailability of the primary node.

10. The access node of claim 9 wherein the control circuit is further configured to send to the packet data serving node in the core network a session seed to enable the core network to page the mobile station only in the time slot to which the mobile station is assigned.

11. The access node of claim 10 wherein the packet data communication link to the core network complies with the Generic Routing Encapsulation (GRE) protocol, and wherein the mobile station identifier is sent to the core network as a GRE key.

* * * * *

UNITED STATES PATENT AND TRADEMARK OFFICE
CERTIFICATE OF CORRECTION

PATENT NO. : 8,130,719 B2
APPLICATION NO. : 11/323461
DATED : March 6, 2012
INVENTOR(S) : Svensson et al.

It is certified that error appears in the above-identified patent and that said Letters Patent is hereby corrected as shown below:

In Column 9, Line 44, delete "(HSPDA)" and insert -- (HSDPA) --, therefor.

Signed and Sealed this
Second Day of October, 2012

David J. Kappos
*Director of the United States Patent and Trademark Office*